United States Patent
Houlemarde

(10) Patent No.: US 10,976,965 B1
(45) Date of Patent: Apr. 13, 2021

(54) OPTIMIZATION OF IN-MEMORY PROCESSING OF DATA REPRESENTED BY AN ACYCLIC GRAPH SO THAT THE REMOVAL AND RE-MATERIALIZATION OF DATA IN SELECTED NODES IS MINIMIZED

(71) Applicant: First Capitol Consulting, Inc., Los Angeles, CA (US)

(72) Inventor: Lou R. Houlemarde, Burbank, CA (US)

(73) Assignee: FIRST CAPITOL CONSULTING, INC., Los Angeles, CA (US)

( * ) Notice: Subject to any disclaimer, the term of this patent is extended or adjusted under 35 U.S.C. 154(b) by 0 days.

(21) Appl. No.: 17/070,068

(22) Filed: Oct. 14, 2020

(51) Int. Cl.
*G06F 16/23* (2019.01)
*G06F 16/2453* (2019.01)
*G06F 3/06* (2006.01)
*G06F 11/34* (2006.01)

(52) U.S. Cl.
CPC ............ *G06F 3/0659* (2013.01); *G06F 3/061* (2013.01); *G06F 3/067* (2013.01); *G06F 16/2393* (2019.01); *G06F 16/2453* (2019.01); *G06F 11/3433* (2013.01)

(58) Field of Classification Search
CPC ............... G06F 3/0659; G06F 16/2393; G06F 16/2453; G06F 3/067; G06F 3/061
USPC ......................................................... 707/759
See application file for complete search history.

(56) References Cited

U.S. PATENT DOCUMENTS

| 6,104,869 | A | * | 8/2000 | Minoya | G06Q 10/04 709/204 |
|---|---|---|---|---|---|
| 6,654,805 | B1 | * | 11/2003 | Aldred | H04L 51/34 709/224 |
| 7,533,096 | B2 | | 5/2009 | Rice et al. | |
| 9,424,043 | B1 | * | 8/2016 | Freeman | G06F 9/38 |
| 9,558,216 | B2 | | 1/2017 | Florendo et al. | |
| 9,619,394 | B2 | * | 4/2017 | Havlir | G06F 12/0875 |
| 9,990,275 | B2 | * | 6/2018 | Harding | G06F 16/2453 |
| 10,310,907 | B1 | * | 6/2019 | Ravindran | G06F 16/27 |
| 10,372,807 | B1 | * | 8/2019 | Greenbaum | G06F 40/177 |
| 10,469,327 | B1 | * | 11/2019 | Velmurugan | H04L 41/0853 |

(Continued)

OTHER PUBLICATIONS

Ivanova et al., "An Architecture for Recycling Intermediates in a Column-Store," ACM Transactions on Database Systems, Oct. 2010, Article No. 24, pp. 1-43, <http://doi.acm.org/10.1145/1862919.1862921>. (Year: 2010).*

*Primary Examiner* — Phuong Thao Cao
(74) *Attorney, Agent, or Firm* — Panitch Schwarze Belisario & Nadel LLP

(57) ABSTRACT

A network of data processing nodes is configured for in-memory data processing. The data processing nodes are interconnected in an acyclic manner, and are connected at an input end to one or more input data sources, and at an output end to one or more output data nodes. Each data processing node is configured to perform one or more data processing operations which generate respective result data that is used as one or both of (i) an input for another data processing node in the network, and (ii) an output to be sent to one of the output data nodes. The result data for each data processing node is stored in a memory of the respective data processing node. Each data processing node includes a flag having a state that controls storage persistence of the result data in the memory of the respective data processing node.

16 Claims, 3 Drawing Sheets

(56) References Cited

U.S. PATENT DOCUMENTS

| | | | | |
|---|---|---|---|---|
| 2003/0041086 A1* | 2/2003 | Lankreijer | G06F 8/458 | 718/102 |
| 2003/0076789 A1* | 4/2003 | Kimura | H04L 41/12 | 370/254 |
| 2004/0015486 A1* | 1/2004 | Liang | G06F 16/9024 | |
| 2005/0138073 A1* | 6/2005 | Zhou | G06F 16/284 | |
| 2006/0218357 A1* | 9/2006 | Shimada | G06F 3/0656 | 711/150 |
| 2007/0121618 A1* | 5/2007 | Hirano | H04L 45/308 | 370/389 |
| 2007/0226269 A1* | 9/2007 | Anna | G06F 16/182 | |
| 2009/0043910 A1* | 2/2009 | Barsness | G06F 16/24532 | 709/237 |
| 2009/0198901 A1* | 8/2009 | Koga | G06F 12/126 | 711/129 |
| 2010/0161846 A1* | 6/2010 | Flachs | G06F 9/30087 | 710/22 |
| 2010/0215253 A1* | 8/2010 | Yamamoto | G06N 3/08 | 382/156 |
| 2011/0169857 A1* | 7/2011 | Harper | G06F 15/76 | 345/589 |
| 2013/0132967 A1* | 5/2013 | Soundararajan | H04L 67/06 | 718/104 |
| 2013/0181994 A1* | 7/2013 | Soum | G06T 11/00 | 345/440 |
| 2013/0326112 A1* | 12/2013 | Park | G06F 1/24 | 711/102 |
| 2014/0258628 A1* | 9/2014 | Shivashankaraiah | G06F 12/0842 | 711/129 |
| 2015/0149400 A1* | 5/2015 | Werner | G06F 16/2282 | 707/600 |
| 2015/0160994 A1* | 6/2015 | Niwa | G06F 11/0778 | 714/19 |
| 2015/0379429 A1* | 12/2015 | Lee | G06N 20/00 | 706/11 |
| 2016/0055220 A1* | 2/2016 | Joshi | G06F 16/248 | 707/722 |
| 2016/0292194 A1* | 10/2016 | Farkash | G06F 16/221 | |
| 2017/0005889 A1* | 1/2017 | Hopcraft | H04L 67/10 | |
| 2017/0024323 A1* | 1/2017 | Havlir | G06F 9/3802 | |
| 2017/0046420 A1* | 2/2017 | Fuchs | G06F 9/46 | |
| 2017/0090814 A1* | 3/2017 | Yeung | G06F 3/0638 | |
| 2017/0116272 A1* | 4/2017 | Lahorani | G06F 16/2455 | |
| 2017/0154092 A1* | 6/2017 | Reimer | G06F 16/2322 | |
| 2017/0177494 A1* | 6/2017 | Choi | G06F 16/9027 | |
| 2018/0139038 A1* | 5/2018 | Schepers | H04L 9/002 | |
| 2018/0203673 A1* | 7/2018 | Ravishankar | G06F 8/36 | |
| 2018/0210833 A1* | 7/2018 | Schlansker | G06F 9/526 | |
| 2019/0042271 A1* | 2/2019 | Tamiya | G06F 9/3877 | |
| 2019/0079962 A1* | 3/2019 | Koepke | G06N 20/00 | |
| 2019/0258575 A1* | 8/2019 | Dey | G06F 12/0802 | |
| 2020/0174698 A1* | 6/2020 | Fang | G06F 3/067 | |
| 2020/0249878 A1* | 8/2020 | Bismuth | G06F 3/0626 | |
| 2020/0348968 A1* | 11/2020 | Huchachar | G06F 16/256 | |
| 2020/0409955 A1* | 12/2020 | Tokarev Sela | G06F 16/24578 | |

\* cited by examiner

OPTIMIZATION OF IN-MEMORY PROCESSING OF DATA REPRESENTED BY AN ACYCLIC GRAPH SO THAT THE REMOVAL AND RE-MATERIALIZATION OF DATA IN SELECTED NODES IS MINIMIZED

BACKGROUND OF THE INVENTION

Modern computing devices have become increasing powerful in terms of processing and memory storage, to the point where large datasets can be contained entirely in memory. This has caused the data processing industry to undergo a large shift away from disk-based processing of information to in-memory processing. For example, a payroll system consisting of several thousand employees in the past would have been stored in a traditional database system, and processing would traditionally occur by structured query language (SQL) statements or other means optimized for disk access. Nowadays, memory is large is enough to contain such data even for the largest of corporations and could perform all the necessary processing entirely within memory; the only I/O steps required may be simply gathering the inputs and saving the results.

In-memory processing often undergoes many steps of computations and transformations to get to a final result. This might include mathematical operations, joining data, adding or dropping columns, and the like. At each step, data must typically be present in memory so that it can be fed into the next process or processes. It can be said that such data is "materialized," where the results of such calculations and transformation are made real and accessible in memory.

Even so, modern databases have over decades of maturity and optimization often benefit from increased memory themselves, even though most of optimization techniques have been built around efficient use of I/O. So, even though much more data can fit into memory, it is even more important that innovative techniques be used to ensure that the relatively-limited resource of memory can be used efficiently when the largest of datasets are used and especially when processing involves many steps.

Essentially, most data processing procedures can be broken down into a series of interrelated and interconnected steps that form an abstract structure of processing nodes and connections to downstream processing nodes. Processing flows from input data to downstream nodes. For example, a JOIN processing operation would take input from two upstream nodes, which represent the left and right sides of the data. The result may then feed into calculation operation, and then a filter operation, until it reached a final output. Of course, when there are hundreds or even thousands of operations, or nodes, the processing algorithm must make sure all operations are run generally so that all dependent operations are completed before any given operation can proceed. Moreover, there cannot be any feedback loops, thus the acyclic general requirement for the processing graph.

Although a computer can process data in memory much faster than if had to constantly use I/O to access the data, in-memory storage is a much more limited resource than disk storage. Often, not all the intermediary results of a complex set of data processing operation can fit into memory. Thus, most in-memory processing systems must have a mechanism to clear such intermediary data as needed. Therefore, to see those intermediary results again, such as for displaying them in a user-interface for example, the data must be regenerated again for that intermediary step, or re-materialized.

When there are such large numbers of operations, a developer that is creating the data processing procedure must frequently be able to see the results of a given processing operation (or step or node.) Because of memory constraints, it can be often impossible to keep an in-memory representation of data in each processed node. However, the ability to see data at any given step is critical to aid in debugging. The challenge is with processing thousands of operations, the data node that the developer may want to examine could be deep within the graph. Thus, if the developer makes a change to an upstream process, the developer may have to wait until the entire graph is re-processed, or at least until the node in question is processed and its results are generated. The present invention seeks to address this issue by optimizing the materialization of those results that are important to user, even as memory is being cleared under pressure.

BRIEF SUMMARY OF THE INVENTION

The present invention is a way of optimizing a class of in-memory data processes, so that the cycle of editing large and complex data-processes and seeing the results is a faster and more practical experience than hereto possible. The system can detect when the user is examining or modifying processes, and obtain the minimum number of data nodes that need to be rerun as changes are made. The system also maintains a prioritization score (also, referred to herein as a "priority score") on processing nodes based on factors such as processing time and overlap of ancestor processes, so that when memory pressure occurs, nodes with the lowest priority are cleared first, thus minimizing the time it takes to reprocess the data that the developer wants to view. The detection of nodes that the developer wants to view can be automatic based on viewing and editing history, and also by the developer's explicit flagging of the processing nodes that they keep their results in-memory.

The system accesses an acyclic graph representing a processing procedure from input data nodes to final output nodes. Each data node generally consists of one or more data processing operations, which may require the additional input of another node's data, depending on the operation, and potentially, the result data. The system runs the processing procedure accordingly from input nodes down to output nodes, checking along the way if a data node is no longer needed by dependent operations in other data nodes. If it is no longer needed, the system, if so configured, has the option to remove the data node's result data at any time, making it unavailable for immediate examination, but thereby making more memory available as processing procedure continues to runs.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. OVERVIEW

One or more data nodes is flagged based on either the user's direction, or a history of the last edited and/or viewed nodes. The system then computes the complete ancestor graph of each of the flagged nodes, then performs a distinct union of all the ancestor graphs. This union set will be the data nodes that the system attempts to retain data for as long as possible when the processing procedure is run. Therefore, if one of the flagged data nodes' operations is changed, all the required ancestor data is more likely to exist in memory to enable much faster re-computation of the node's data.

In another embodiment of the invention, the data nodes are prioritized by a pointing system that helps indicate to the system how likely that their result data will be needed for viewing and/or re-computation after changes to its operations. For example, each time a data node falls within an ancestor graph of a flagged data node, the system would add a point to it. In a further variation, each of the ancestor graphs can have a different point values: for instance, a data node flagged by the user could have five points instead of one point added to its ancestor data nodes when used to assign points, thereby giving more prioritization weight to the user's explicit directives. In any case, when the system runs the processing procedure and encounters memory pressure, it can, if so configured, start removing (deleting) the result data in the data nodes that have the lowest priority points. This enables the system to be more likely to show the desired result data from memory, which is the fastest experience when examining and debugging complex processing procedures with large amounts of data.

II. DETAILED DISCLOSURE

Figure 1:
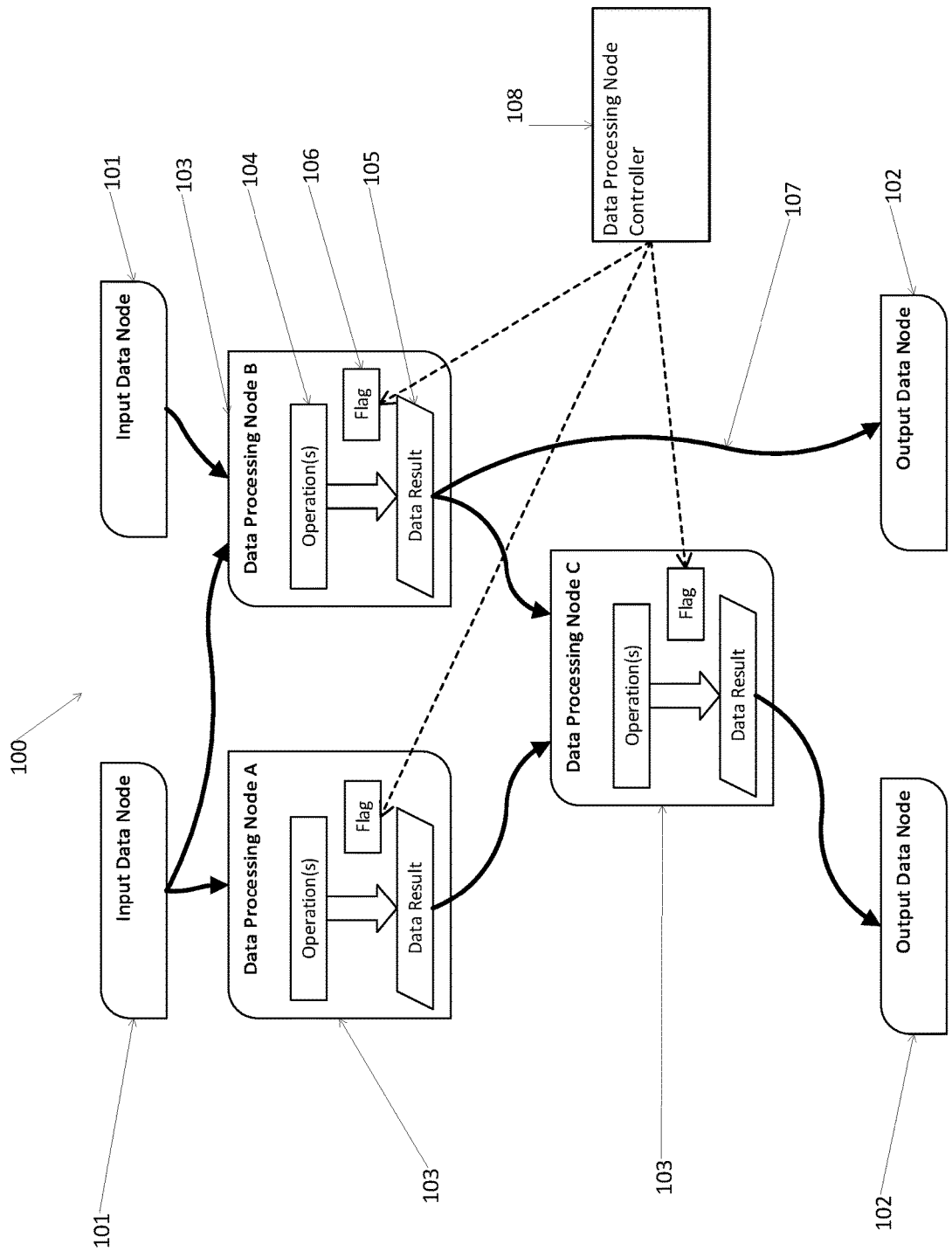
FIG. 1 is a diagram of a processing procedure within the system, represented as an acyclic graph of data processing nodes with flags that indicate if the system should try to preserve resulting data.

FIG. 1 shows processing procedure 100 containing an acyclic graph of interconnected nodes, which can be categorized as input data nodes 101, data processing nodes 103, and output data nodes 102, and a data processing node controller 108. Data is processed through this system according to the direction of the graph indicated by the directional arrows 107, generally from input to output. Each individual data processing node 103 will process data by means of arbitrary data operation(s) 104 into a data result 105, which can be fed into one or more descendant nodes until complete. For example, in this diagram, Data Processing Node C must use the data result 105 from Data Processing Node A and Data Processing Node B. If during running processing procedure 100, the system becomes starved for memory, it can remove the data result 105 from Data Processing Node A and Data Processing Node B once Data Processing Node C is complete. However, the data processing node controller 108 can set the flag 106 associated with any data processing node 103 to indicate that its data result 105 is not cleared. This can be done manually at the behest of the user who wants to see the data, or by automatic means. The data result 105 is stored in a memory in each of the respective data processing nodes. Thus, each flag 106 has a state that controls storage persistence of the result data in the memory in each of the respective data processing nodes.

To summarize, the flag 106 may indicate that any result data will automatically be persistently stored (i.e., preserved) in the memory of the respective data processing node, or the flag may indicate that any result data will be automatically deleted from the memory of the respective data processing node after the result data is provided to any interconnected downstream data processing node. Alternatively, algorithmic processes may be used to assign a priority score to each processing node, and the state of the flag for a specific data processing node is based on the priority score assigned to the respective data processing node. In this manner, the result data in the respective data processing nodes are deleted in order of their priority score, wherein the data processing nodes receiving the lowest priority scores have their result data deleted first, and the data processing nodes receiving the highest priority scores have their result data deleted last.

One such algorithmic process described herein determines the priority score based on how frequently each of the data processing nodes are viewed with respect to each other during a predetermined time period. In this process, the state of the flag for a specific data processing node is based on the priority score assigned to the respective data processing node, the most frequently viewed data processing nodes receiving the highest priority score and the least frequently viewed data processing nodes receiving the lowest priority score. The result data in the respective data processing nodes are deleted in order of their priority score, wherein the data processing nodes receiving the lowest priority scores have their result data deleted first, and the data processing nodes receiving the highest priority scores have their result data deleted last.

Figure 2:
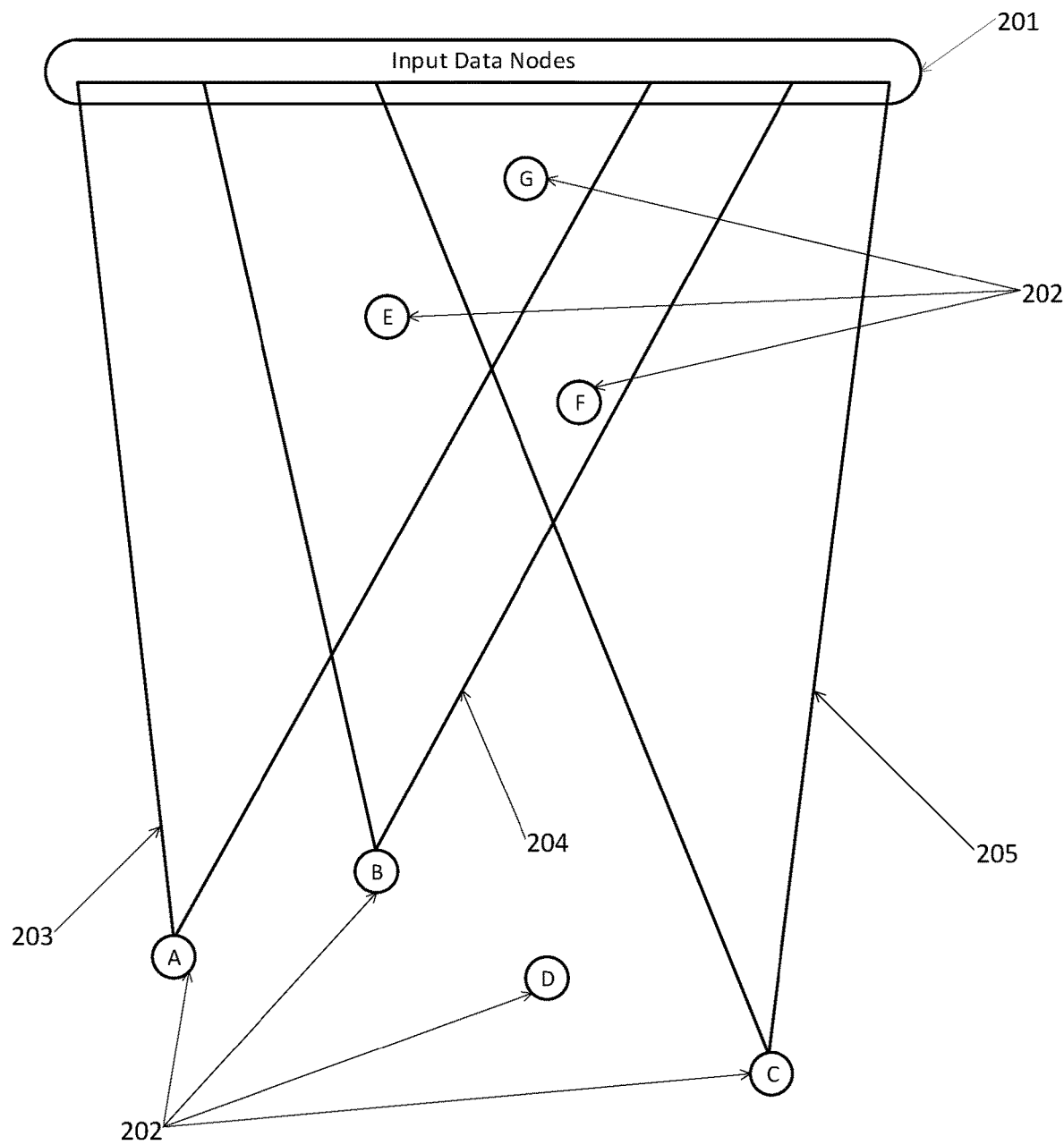
FIG. 2 is a diagram of a processing procedure within the system, represented as an acyclic graph containing overlapping regions of processing nodes that are ancestor nodes from selected prioritized nodes, and the prioritization score.
Figure 3:
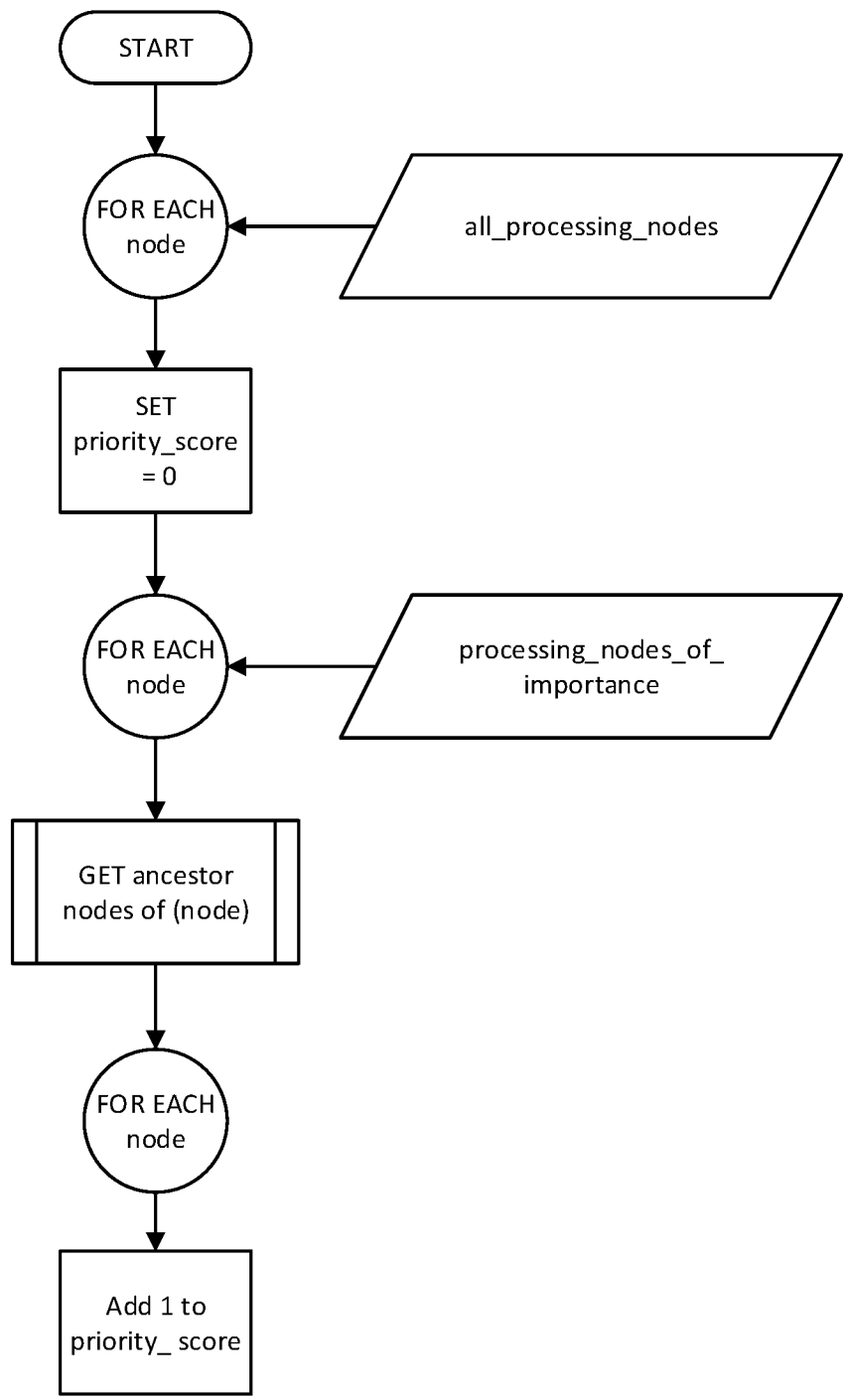
FIG. 3 is a flowchart of one preferred embodiment of the present invention.

Another algorithmic process described with respect to FIGS. 2 and 3 determines the priority score using an ancestor tree algorithm.

FIG. 2 shows an example of a stylized set of ancestor acyclic graphs represented as triangular regions 203, 204 and 205 each containing a large number of data processing nodes that project from a single processing node 202 A, B and C respectively, all the way to their ancestor input data nodes 201. The overlapping regions of the triangles represent shared ancestor processing nodes. For example, data processing node E is an ancestor of data processing nodes A and B. Similarly, data processing node F would be in both ancestor graphs of data processing nodes B and C. Further, data processing node G would be an ancestor of processing nodes A, B and C. Finally, data processing node D illustrates that there are other data processing nodes that may not be in the any of these ancestor graph regions.

Assuming that the data processing nodes A, B and C are flagged for the retention and/or materialization of their data in memory, the degree of overlap of their ancestor graphs can be used in a scoring system to help prioritize the order in which a data processing node's data is removed (deleted) under memory pressure. As an example, data processing node D is not in any of the ancestor graphs, so it could be assigned a score of 0. Data processing nodes E and F have two overlaps and the score would be 2. Data processing node G has three overlaps and could be assigned a score of 3. All other data processing nodes under each ancestor graph (not overlapping) would have a score of 1. As memory pressure is encountered, the processing system could clear the data with the lowest scores first, thus minimizing the time recompute the results of processing nodes A, B and C as data is being cleared under memory pressure.

FIG. 3 is a self-explanatory flowchart the depicts a method for scoring data based on the overlap of the ancestor graph from data processing node(s) that have been flagged for retention in memory. Sample pseudocode for one preferred embodiment of the flowchart is as follows:

```
FOR EACH node IN all_processing nodes
   node.priority_score=0
   FOR EACH important_node IN processing_nodes_of_importance
      FOR EACH ancestor_node in ancestor_nodes_of(important_node)
         ancestor_node.priority_score++
```

The present invention is preferably implemented in software code which can be executed on any suitable processor or collection of processors, whether provided in a single computer or distributed among multiple computers.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

As explained above, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method for controlling storage persistence in data processing nodes, the data processing nodes being arranged in a network of data processing nodes configured for in-memory data processing, the data processing nodes being interconnected in an acyclic manner, and being connected at an input end to one or more input data sources, and at an output end to one or more output data nodes, each data processing node being configured to perform one or more data processing operations which generate respective result data that is used as one or both of (i) an input for another data processing node in the network, and (ii) an output to be sent to one of the output data nodes, wherein the result data for each data processing node is stored in a memory of the respective data processing node, and wherein each data processing node includes a flag having a state that controls storage persistence of the result data in the memory of the respective data processing node, the method comprising:
   (a) determining the storage persistence desired for each of the data processing nodes, and
   (b) electronically setting the state of each flag based on the determined storage persistence,
      wherein step (a) further comprises assigning a priority score to each data processing node based on how frequently each of the data processing nodes are viewed with respect to one another during a predetermined time period, and
      wherein step (b) further comprises electronically setting the state of each flag for a specific data processing node based on the priority score assigned to the respective data processing node, the most frequently viewed data processing nodes receiving the highest priority score and the least frequently viewed data processing nodes receiving the lowest priority score, and wherein the result data in the respective data processing nodes are deleted in order of their priority score, the data processing nodes receiving the lowest priority scores having their result data deleted first, and the data processing nodes receiving the highest priority scores having their result data deleted last.

2. The method of claim 1 wherein step (a) further comprises determining that result data for a specific data processing node should be persistently stored in the memory of the respective data processing node, and step (b) further comprises electronically setting the state of the flag for the specific data processing node to persistently store the result data stored in the memory of the respective data processing node.

3. The method of claim 1 wherein step (a) further comprises determining that result data for a specific data processing node should be automatically deleted from the memory of the respective data processing node after the result data is provided to any interconnected downstream data processing node, and step (b) further comprises electronically setting the state of the flag for the specific data processing node to automatically delete the result data stored in the memory of the respective data processing node.

4. The method of claim 1 wherein a data processing node controller is in electronic communication with each of the data processing nodes, the method further comprising:
(c) setting the state of the flag in each of the data processing nodes by the data processing node controller.

5. A method for controlling storage persistence in data processing nodes, the data processing nodes being arranged in a network of data processing nodes configured for in-memory data processing, the data processing nodes being interconnected in an acyclic manner, and being connected at an input end to one or more input data sources, and at an output end to one or more output data nodes, each data processing node being configured to perform one or more data processing operations which generate respective result data that is used as one or both of (i) an input for another data processing node in the network, and (ii) an output to be sent to one of the output data nodes, wherein the result data for each data processing node is stored in a memory of the respective data processing node, and wherein each data processing node includes a flag having a state that controls storage persistence of the result data in the memory of the respective data processing node, the method comprising:
(a) determining the storage persistence desired for each of the data processing nodes, and
(b) electronically setting the state of each flag based on the determined storage persistence,
wherein each data processing node is assigned a priority score based on how many shared ancestor nodes it has with respect to the other data processing nodes, the data processing nodes with the highest number of shared ancestor nodes receiving the highest priority score and the data processing nodes with the lowest number of shared ancestor nodes receiving the lowest priority score, the data processing nodes receiving the lowest priority scores having their result data deleted first, and the data processing nodes receiving the highest priority scores having their result data deleted last.

6. The method of claim 5 wherein step (a) further comprises determining that result data for a specific data processing node should be persistently stored in the memory of the respective data processing node, and step (b) further comprises electronically setting the state of the flag for the specific data processing node to persistently store the result data stored in the memory of the respective data processing node.

7. The method of claim 5 wherein step (a) further comprises determining that result data for a specific data processing node should be automatically deleted from the memory of the respective data processing node after the result data is provided to any interconnected downstream data processing node, and step (b) further comprises electronically setting the state of the flag for the specific data processing node to automatically delete the result data stored in the memory of the respective data processing node.

8. The method of claim 5 wherein a data processing node controller is in electronic communication with each of the data processing nodes, the method further comprising:
(c) setting the state of the flag in each of the data processing nodes by the data processing node controller.

9. A computer program product for controlling storage persistence in data processing nodes, the data processing nodes being arranged in a network of data processing nodes configured for in-memory data processing, the data processing nodes being interconnected in an acyclic manner, and being connected at an input end to one or more input data sources, and at an output end to one or more output data nodes, each data processing node being configured to perform one or more data processing operations which generate respective result data that is used as one or both of (i) an input for another data processing node in the network, and (ii) an output to be sent to one of the output data nodes, wherein the result data for each data processing node is stored in a memory of the respective data processing node, and wherein each data processing node includes a flag having a state that controls storage persistence of the result data in the memory of the respective data processing node, the computer program product comprising a non-transitory computer readable storage medium tangibly embodying non-transitory computer-executable program instructions thereon that, when executed, cause one or more computing devices to:
(a) determine the storage persistence desired for each of the data processing nodes, and
(b) electronically set the state of each flag based on the determined storage persistence,
wherein step (a) further comprises assigning a priority score to each data processing node based on how frequently each of the data processing nodes are viewed with respect to one another during a predetermined time period, and
wherein step (b) further comprises electronically setting the state of each flag for a specific data processing node based on the priority score assigned to the respective data processing node, the most frequently viewed data processing nodes receiving the highest priority score and the least frequently viewed data processing nodes receiving the lowest priority score, and
wherein the result data in the respective data processing nodes are deleted in order of their priority score, the data processing nodes receiving the lowest priority scores having their result data deleted first, and the data processing nodes receiving the highest priority scores having their result data deleted last.

10. The computer program product of claim 9 wherein step (a) further comprises determining that result data for a specific data processing node should be persistently stored in the memory of the respective data processing node, and step (b) further comprises electronically setting the state of the flag for the specific data processing node to persistently store the result data stored in the memory of the respective data processing node.

11. The computer program product of claim 9 wherein step (a) further comprises determining that result data for a specific data processing node should be automatically deleted from the memory of the respective data processing node after the result data is provided to any interconnected downstream data processing node, and step (b) further comprises electronically setting the state of the flag for the specific data processing node to automatically delete the result data stored in the memory of the respective data processing node.

12. The computer program product of claim 9 wherein a data processing node controller is in electronic communication with each of the data processing nodes, and wherein the computer-executable program instructions, when executed, further cause the one or more computing devices to:
   (c) set the state of the flag in each of the data processing nodes by the data processing node controller.

13. A computer program product for controlling storage persistence in data processing nodes, the data processing nodes being arranged in a network of data processing nodes configured for in-memory data processing, the data processing nodes being interconnected in an acyclic manner, and being connected at an input end to one or more input data sources, and at an output end to one or more output data nodes, each data processing node being configured to perform one or more data processing operations which generate respective result data that is used as one or both of (i) an input for another data processing node in the network, and (ii) an output to be sent to one of the output data nodes, wherein the result data for each data processing node is stored in a memory of the respective data processing node, and wherein each data processing node includes a flag having a state that controls storage persistence of the result data in the memory of the respective data processing node, the computer program product comprising a non-transitory computer readable storage medium tangibly embodying non-transitory computer-executable program instructions thereon that, when executed, cause one or more computing devices to:
   (a) determine the storage persistence desired for each of the data processing nodes, and
   (b) electronically set the state of each flag based on the determined storage persistence,
      wherein each data processing node is assigned a priority score based on how many shared ancestor nodes it has with respect to the other data processing nodes, the data processing nodes with the highest number of shared ancestor nodes receiving the highest priority score and the data processing nodes with the lowest number of shared ancestor nodes receiving the lowest priority score, the data processing nodes receiving the lowest priority scores having their result data deleted first, and the data processing nodes receiving the highest priority scores having their result data deleted last.

14. The computer program product of claim 13 wherein step (a) further comprises determining that result data for a specific data processing node should be persistently stored in the memory of the respective data processing node, and step (b) further comprises electronically setting the state of the flag for the specific data processing node to persistently store the result data stored in the memory of the respective data processing node.

15. The computer program product of claim 13 wherein step (a) further comprises determining that result data for a specific data processing node should be automatically deleted from the memory of the respective data processing node after the result data is provided to any interconnected downstream data processing node, and step (b) further comprises electronically setting the state of the flag for the specific data processing node to automatically delete the result data stored in the memory of the respective data processing node.

16. The computer program product of claim 13 wherein a data processing node controller is in electronic communication with each of the data processing nodes, and wherein the computer-executable program instructions, when executed, further cause the one or more computing devices to:
   (c) set the state of the flag in each of the data processing nodes by the data processing node controller.

\* \* \* \* \*